United States Patent
Sharma

(10) Patent No.: US 11,222,406 B2
(45) Date of Patent: Jan. 11, 2022

(54) METHOD AND SYSTEM FOR TRAINING A MACHINE LEARNING-BASED IMAGE DENOISING SYSTEM

(71) Applicant: CANON MEDICAL SYSTEMS CORPORATION, Otawara (JP)

(72) Inventor: Anuj Sharma, Vernon Hills, IL (US)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 36 days.

(21) Appl. No.: 16/893,780

(22) Filed: Jun. 5, 2020

(65) Prior Publication Data

US 2021/0383510 A1 Dec. 9, 2021

(51) Int. Cl.
*G06T 7/00* (2017.01)
*G06T 5/00* (2006.01)
(Continued)

(52) U.S. Cl.
CPC ............ *G06T 5/002* (2013.01); *G06K 9/6256* (2013.01); *G06T 5/50* (2013.01); *G06T 7/0012* (2013.01);
(Continued)

(58) Field of Classification Search
CPC ........... G06T 5/002; G06T 5/50; G06T 5/003; G06T 5/001; G06T 7/0012; G06T 7/0014; G06T 7/11; G06T 2207/10088; G06T 2207/20081; G06T 2207/20084; G06T 2207/10081; G06T 2207/20012; G06T 2207/20016; G06T 2207/20021; G06T 2207/20024; G06T 2207/20221; G06T 2207/30004; G06T 2207/20182;
(Continued)

(56) References Cited

U.S. PATENT DOCUMENTS 8,374,457 B1   2/2013  Wang et al.
2012/0224760 A1  9/2012  Goshen et al.
(Continued)

OTHER PUBLICATIONS

Hu Chen, Yi Zhang. Weiua Zhang, Peixi Ljac, Ke Li, Jiilu Zhou, Ge Wang. "Low-Dose CT via Deep Neural Network."
(Continued)

*Primary Examiner* — Jose L Couso
(74) *Attorney, Agent, or Firm* — Oblon, McClelland, Maier & Neustadt, L.L.P.

(57) ABSTRACT

A synthetically generated noise image is generated from at least one high signal-to-noise ratio target image and at least two zero-mean Gaussian noise images, scaled according to a noise scale. The images are combined in a non-linear manner to produce the synthetically generated noise image which can be used as a training image in a machine learning-based system that "denoises" images. The process can be repeated for a number of different noise scales to produce a set of training images. In one embodiment, the synthetically generated noise image $I_N$ is generated according to:

$$I_N = \sqrt{I_1^2 + I_2^2}$$

where I is the original target image, $I_1 = I + pG_1$ and $I_2 = pG_2$, and where G1 and G2 are zero-mean Gaussian noise images, and p is the noise scale.

20 Claims, 14 Drawing Sheets

300

(51) Int. Cl.
*G06T 5/50* (2006.01)
*G06K 9/62* (2006.01)

(52) U.S. Cl.
CPC ............... *G06T 2207/10088* (2013.01); *G06T 2207/20081* (2013.01); *G06T 2207/20084* (2013.01)

(58) Field of Classification Search
CPC ........... G06T 2207/20076; G06T 2207/10056; G06T 2207/30024; G06T 2207/30048; G06T 2207/30056; G06T 2207/30101; G06T 2210/41; G06T 2211/421; G06T 2211/424; G06T 2211/416; G06T 3/4046; G06T 3/4053; G06T 3/4076; G06T 3/40; G06T 11/006; G06T 11/008; G06T 11/005; G06T 11/003; G06K 9/6256; G06K 9/66; G06K 9/40; G06K 9/4628; G06K 9/6255; G06K 9/6273; G06K 9/6215; G06K 9/6217; G06K 9/6231; G06K 9/6267; G06K 9/00281; G06K 9/00288; G06K 9/6274; G06K 2209/05; G06N 3/08–3/088; G06N 3/0445; G06N 3/0454; G06N 3/0472; G06N 3/04; G06N 5/00; G06N 20/00; G06N 20/10; G06N 20/20; G06N 7/005; A61B 5/055; A61B 5/00; A61B 5/7267; A61B 5/7203; A61B 5/7207; A61B 5/7264; A61B 6/5258; G01R 33/5608; G01R 33/565; G16H 30/20; G16H 30/40; G02B 21/365; H04N 5/23229
See application file for complete search history.

(56) References Cited

U.S. PATENT DOCUMENTS

| | | | |
|---|---|---|---|
| 2017/0132760 A1 | 5/2017 | Kothule et al. | |
| 2018/0144466 A1* | 5/2018 | Hsieh | G06N 3/04 |
| 2018/0293762 A1* | 10/2018 | Fu | G06K 9/66 |
| 2019/0095795 A1* | 3/2019 | Ren | G06N 3/082 |
| 2019/0251668 A1 | 8/2019 | Meyer et al. | |
| 2019/0378270 A1* | 12/2019 | Ida | A61B 5/055 |
| 2020/0058106 A1* | 2/2020 | Lazarus | G06K 9/40 |
| 2020/0234080 A1* | 7/2020 | Ciller Ruiz | G06T 11/008 |

OTHER PUBLICATIONS

Yuewen Sun, Ximing Liu, Peng Cong, Litao Li, Zhongwei Zhao, "Digital radiography image denoising using a generative adversarial network" Journal of X-Ray Science and Technology 26 (2018), pp. 523-534, DOI 10.3233/XST-17356 IOS Press.
Junshen Xu, Enhao Gong, John Pauly and Greg Zaharchuk, "200x Low-dose PET Reconstruction using Deep Learning." Dec. 1, 2017.
Jing Wang, Hongbing Lu, Zhengrong Liang, Daria Eremma, Guangxang Zhang, Su Wang, Jot Chen, James Manzione, ; "An experimental study on the noise properties of X-ray CT sinogram data in Radon space," Phys Med Biol, Jun. 21, 2008; 53(12): 3327-3341.
Chih-Chieh Liu and Jinyi Qi. Highet SNR PET image prediction using a deep leaming model and MRI Image? Phys. Med. Biol. 2019. 64 115034.
Hougiang Yu, Mingvue Ding, Xaminig Zhang, Jinbo Wu, "PCANet based nonlocal means method for speckle noise removal in ultrasound images," PLoS ONE 13(10):e0205398.
Shiwei Zhou, Yu-Hen Hu and Hongru Jiang, "Multi-View image Denoising Using Convclutional Neural Network." Dept. of Electrical and Computer Engineering, University of Madison, WI. Jun. 7, 2019. doi: 10.3390/s19112597.

* cited by examiner

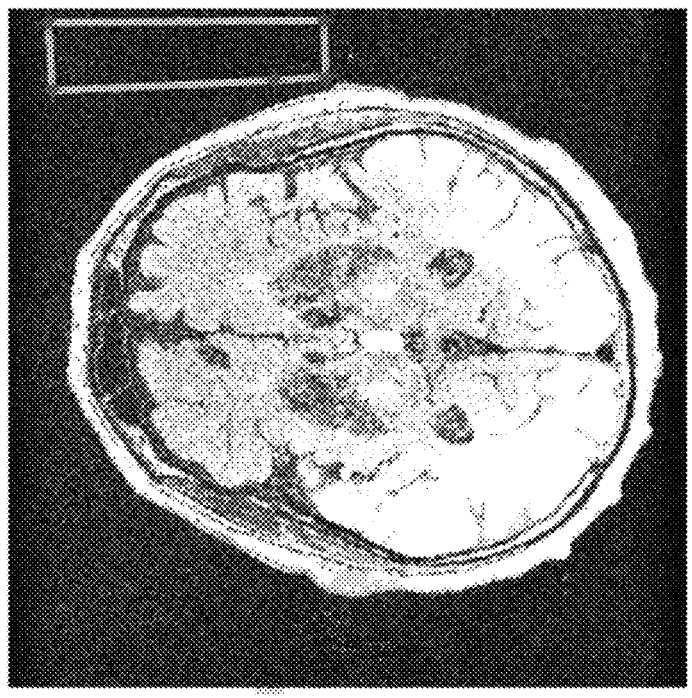

METHOD AND SYSTEM FOR TRAINING A MACHINE LEARNING-BASED IMAGE DENOISING SYSTEM

FIELD OF THE INVENTION

This disclosure relates to imaging systems, and in one embodiment to a method and system for training a machine learning-based image denoising system for a magnetic resonance imaging system using multiple region-specific noise techniques.

BACKGROUND

Magnetic resonance (MR) images have been studied to analyze the noise properties that occur in the MR images. According to published reports (e.g., Gudbjartsson H, et al. *The Rician distribution of noisy MRI data*, MRM 34:910-914, 1995) (hereinafter "Gudbjartsson"), and as shown in FIG. 1 thereof which is reproduced as FIG. 1 herein, at low signal-to-noise ratio (SNR) (M/σ) values, the probability density function of magnitude MR images follows a Rician distribution, whereas at higher SNR values (even at M/σ>3), the Rician distribution is closely approximated by a Gaussian distribution.

Some known machine learning based de-noising methods use a 'simple' noise model to generate the training dataset. For example, uniform Gaussian noise was added to target images in Zhao et al, *Simultaneous denoising of multi-contrast MR images using a novel weighted nuclear norm minimization approach*, p. 669, ISMRM 2019; and Shinoda et al, *Deep learning based adaptive noise reduction in multi-contrast MR images*, p. 4701, ISMRM 2019. Alternatively, uniform Rician noise was added to target images in Jiang et al, *Denoising of 3D magnetic resonance images with multi-channel residual learning of convolutional neural network*, arXiv:1712.08726v2, 2018.

Alternatively, known systems have added Gaussian noise to the raw k-space data. This data when passed through the reconstruction pipeline will produce images with 'true' noise distribution, but such an approach has several drawbacks. For example, in machine learning-based denoising methods, the noisy training images are generated by adding noise to high-SNR images. High-SNR images can be acquired by either running a scan with several averages (NAQ) and averaging the raw data (e.g., on an FPGA) or running several 1-NAQ scans and then averaging the images offline. The latter method allows images to be co-registered before averaging to avoid motion artifacts in the averaged images. However, if noise were to be added in the averaged image's k-space, then this averaged image needs to be passed through an inverse of the reconstruction pipeline; then noise in k-space is added; then the data is run through reconstruction. Taking an FFT of the averaged image to generate high-SNR k-space data may be problematic because the data will contain all the corrections and steps that have already been applied to the original 1-NAQ image.

Furthermore, special consideration may be needed for phased-array coils (e.g., addressing whether all coils contribute equal noise; addressing the spatial distribution; addressing how channel noise cross-correlation affects what noise is added to each channel; addressing how parallel imaging reconstruction (like SPEEDER and CS) are affected). Known image domain methods add noise to the coil-combined image so it is immune to these factors.

By contrast, directly adding noise to images keeps the training set generation method in the same domain as where de-noising is performed. De-noising is performed in the image space and not k-space. Convolution Neural Network (CNN)-based methods work well in the 'natural' image domain by learning spatial features.

In general, though denoising techniques are known, methods for generating MR training data are ill-defined. For effective training, known machine learning methods require large amounts of training data (e.g., tens of thousands of images) and is produced in the form of (noisy input, noise-free target) image pairs where the difference between the input and target images are their noise content. The pairs match (between themselves) in all other aspects such as contrast and geometry.

Moreover, for increased accuracy, the training data set should be representative of the target application and should include images with noise levels and distributions that will be practically encountered in the clinic. However, the noise range can be different for the different contrasts. Some contrasts (e.g., DWI) are inherently noisier than other contrasts such as T2 W. In some configurations, a large set of training image pairs can be acquired on the scanner by using a range of scan parameters that change the image noise level.

However, acquiring large amounts of data is generally both time consuming and costly. Thus, practically, a smaller dataset is initially acquired and used to synthesize a larger set of training data. One technique for doing so is to generate high-SNR target images by acquiring images with large number of averages (NAQ), and training input images are synthesized by adding artificial noise to the high-SNR target images. For example, 10 training pairs could be generated from 1 target image by adding 10 different levels of noise to the target image. When simple techniques add uniform Gaussian noise (as in Zhao et al. and in Shinoda et al.) or uniform Rician noise (as in Jiang et al.), those simple techniques do not account for a number of factors. For example, those techniques do not address changes to the noise distribution by the reconstruction pipeline where various pipeline stages affect noise (e.g., SENSE: maintains Gaussian noise distribution, but sum-of-squares combination of the multi-channel images changes an image's noise distribution to a non-central chi-squared and magnitude operations change an image's noise distribution to Rician). (Additional information about SENSE can be found in Preussmann et al, *SENSE: Sensitivity Encoding for fast MRI*, Magnetic Resonance in Medicine 42:952-962 (1999)) Furthermore, those techniques do not address the spatial non-uniformity within a magnitude MR image where different spatial locations have different distributions. Thus, noise in the training data set generated using the simple uniform noise models may not match the properties of the images on which de-noising is applied in the clinic, thereby producing less accurate results.

SUMMARY

To address at least one problem identified with known techniques, the present disclosure describes a method and system for generating noisy training medical images from original medical images to be applied to a machine learning-based system so that the machine learning-based system can learn to denoise other medical images. According to one such embodiment, a system generates images that reside in the natural MR noise domain avoiding any model assumptions. Such images have realistic MR noise characteristics (distribution and level). To achieve this, an original image is split into two sub-images: (1) an original image with additive noise and (2) a noise-only image. The two images are combined using MR reconstructions steps that produce the desired natural MR noise characteristics.

The above noise generation process is part of an overall image training process which includes (1) estimating noise distribution of an original image, (2) measuring a noise level of the original image, (3) determining a noise range for the original image, (4) generating high signal-to-noise ratio target images (including possibly registering training images and/or normalizing and clipping images); and (5) generating plural noisy images (e.g., at different noise levels) as training images from the original image to be paired with the high signal-to-noise ratio target images.

As part of the step of generating plural noisy images from the high signal-to-noise ratio target images, at least two zero-mean Gaussian noise images are generated, scaled according to a noise scale, and combined in a non-linear manner to produce a noisy image which can be used as a training input image. The process can be repeated for a number of different noise scales to produce a set of training images and can be repeated a number of different times to produce additional training input images. In one embodiment, a synthetically generated noise image $I_N$ for use as a training input image is generated according to:

$$I_N = \sqrt{I_1^2 + I_2^2}$$

where I is the original image, $I_1 = I + pG_1$ and $I_2 = pG_2$, and where G1 and G2 are zero-mean Gaussian noise images, and p is the noise scale.

Note that this summary section does not specify every embodiment and/or incrementally novel aspect of the present disclosure or claimed invention. Instead, this summary only provides a preliminary discussion of different embodiments and corresponding points of novelty. For additional details and/or possible perspectives of the invention and embodiments, the reader is directed to the Detailed Description section and corresponding figures of the present disclosure as further discussed below.

BRIEF DESCRIPTION OF THE DRAWINGS

Various embodiments of this disclosure that are proposed as examples will be described in detail with reference to the following figures, wherein like numerals reference like elements, and wherein:

FIG. 28 is the exemplary original noisy magnitude MR image of FIG. 2A that has been denoised using a convolutional neural network that has been trained using just Rican noise;

FIG. 7A is an original image of a brain where the original image includes a region of interest that is used to specify an area of background voxels (as opposed to the brain);

FIG. 7B is a masked image that includes only voxels that are associated with the tissue (or organ) of interest (e.g., the brain) and that excludes background voxels;

DETAILED DESCRIPTION

Figure 1:
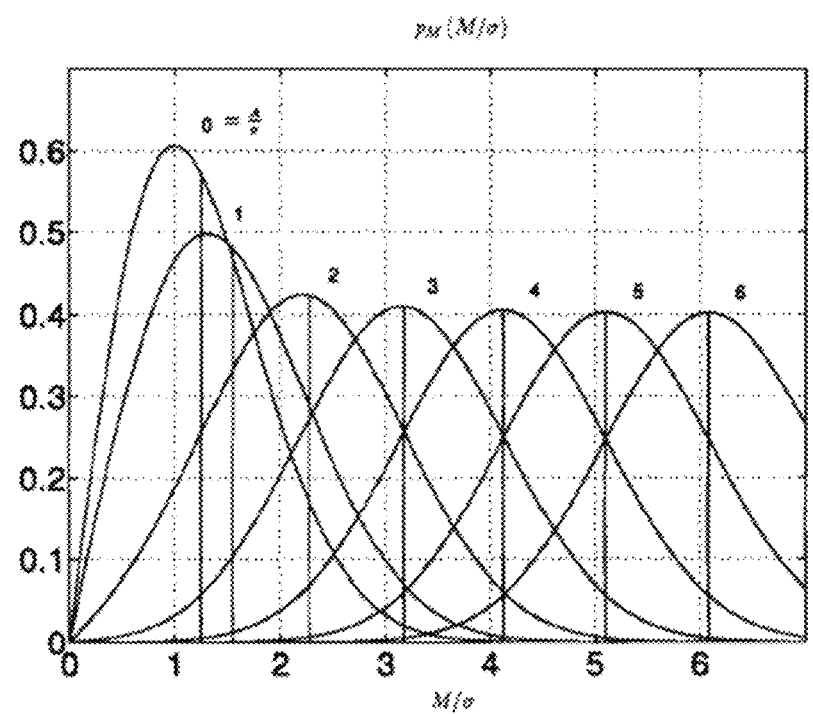
FIG. 1 is a graph of a probability density function of magnitude MR images with different signal-to-noise ratios where low signal-to-noise ratios exhibit a Rician distribution whereas larger signal-to-noise ratios (even at M/σ>3) exhibit Gaussian distributions.

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The order of discussion of the different steps as described herein has been presented for the sake of clarity. In general, these steps can be performed in any suitable order. Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

To increase accuracy in a denoising operation of a medical image, it is possible to use a machine learning-based approach. To improve performance, both a high-noise input image and an exactly matching low-noise target image would be acquired to form a training image pair. However, two images that have exact anatomical match are difficult if not impossible to acquire because of subject and physiological motion. Even image registration of input and target images does not work perfectly because of through-plane motion and the time penalty to acquire high through-plane resolutions for accurate image registrations. Therefore, to achieve increased accuracy, training images should differ only in noise otherwise the machine learning system may learn to remove structure from the input images. To address the absence of a perfect anatomical match between input and target images; the input images are created by adding region-specific synthetic noise to the high-SNR target images, and the noisy images are then used to train to a machine learning-based system to reproduce the high-SNR target images.

In general, the method and system described herein utilize region-specific noise techniques to better configure a machine learning-based system to reduce the noise in medical images, such as magnitude MR images, during a denoising process. In one such embodiment, in voxels of magnitude MR images corresponding to tissue, generation of a noisy input image is performed based on a Gaussian noise distribution, whereas in voxels of magnitude MR images corresponding to low signal (like dark CSF in T1 W) or no signal (like air voxels in sinuses and background), generation of the noisy input image is performed based on a Rician noise distribution. In voxels of other kinds of images, noise generation of input images having other types of noise distributions can be performed. Furthermore, the generation of input images is not limited to two different types of noise distributions. For example, a non-central chi-square distribution, created by the sum-of-squares operation, can also affect MR data and can be similarly compensated for. In general, "n" different synthetically generated noisy images (or image regions) can be combined together to form a final noisy image that can be used for training.

Figures 2A, 2B, 2C:
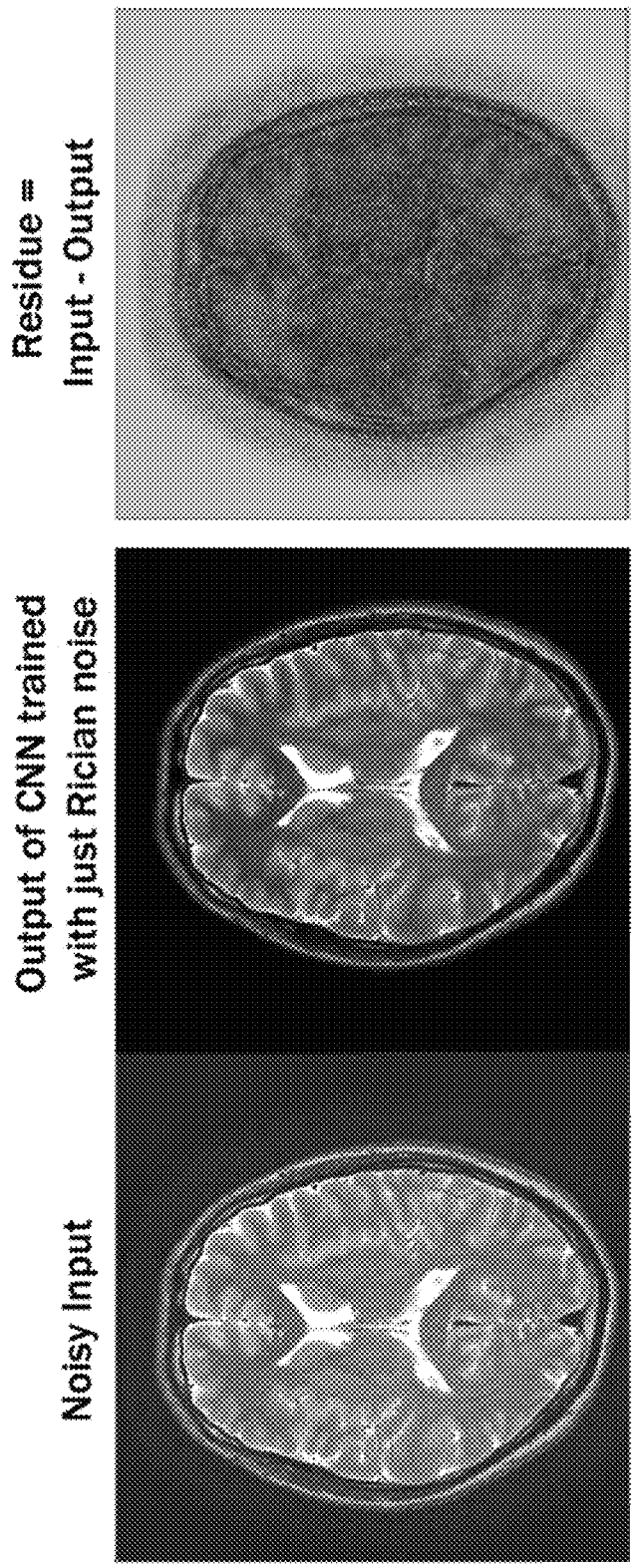
FIG. 2A is an exemplary original noisy magnitude MR image.
FIG. 2C is a residue image showing the result of taking a difference of the denoised image of FIG. 28 and the original image of FIG. 2A (i.e., FIG. 2B minus FIG. 2A)

As shown in FIG. 2C, a residue image, showing the result of taking a difference of the denoised image of FIG. 2B and an original image of FIG. 2A (i.e., FIG. 2B minus FIG. 2A), shows that the output image of FIG. 2B is de-noised (as compared to the original noisy image of FIG. 2A), but without the techniques of the present disclosure, there has been a change in contrast as seen in white matter and background intensity. Ideally, the residue image of FIG. 2C should not contain structure, and the techniques of the present disclosure address this issue. Moreover, the residue image of FIG. 2C shows that the CNN trained on simple Rician noise adds bias to images containing both Gaussian and Rician distributions.

Figure 3:
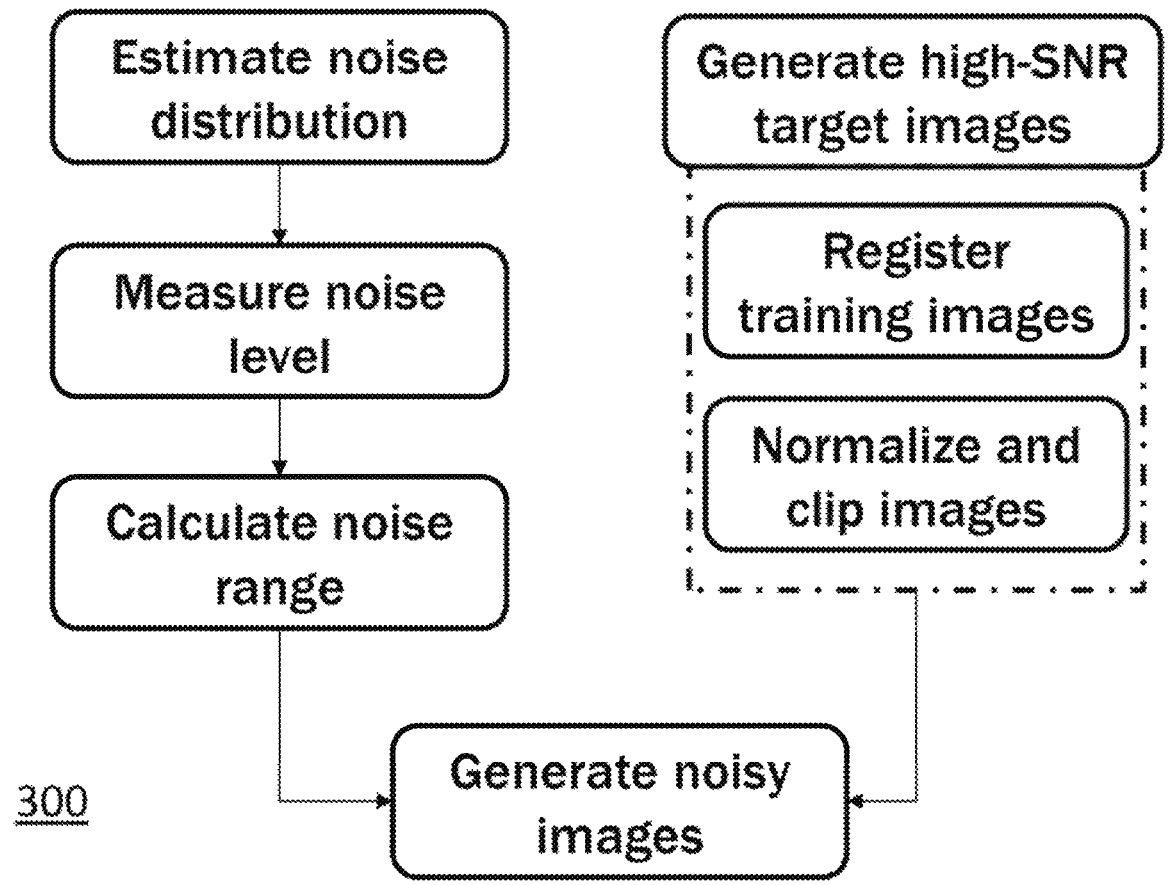
FIG. 3 is a data flowchart showing an exemplary embodiment of how noisy training images can be generated at multiple noise levels from high signal-to-noise ratio target images.

FIG. 3 is a data flowchart showing an exemplary embodiment of a method 300 for generating noisy training images at one or more noise levels from high signal-to-noise ratio target images. As discussed in greater detail below, such a method can be performed as part of an exemplary system shown in FIG. 15 in which noisy images are generated from target images to train a machine learning-based system to produce a trained machine learning-based system for denoising images.

In general, the left-hand side of FIG. 3 is machine/environment specific information that is processed to determine how acquired target images are to be processed to generate noisy training images for the machine learning-based system. The right-hand side is specific to high-resolution images that are obtained in the imaging system, and the center-bottom box represents how the disclosed system and method combine the two.

In general, the illustrated training image generation process includes, but is not limited to, (1) estimating noise distribution of an imaging environment under a particular set of imaging conditions, (2) measuring a noise level corresponding to the image environment under a corresponding set of conditions, (3) determining a noise range corresponding to the image environment under a corresponding set of conditions, (4) generating at least one high signal-to-noise ratio target image (including possibly registering training images and/or normalizing and clipping images); and (5) generating plural noisy images (e.g., at different noise levels) as training images from the at least one high signal-to-noise ratio target image corresponding to the image environment under a corresponding set of conditions.

Figure 4:
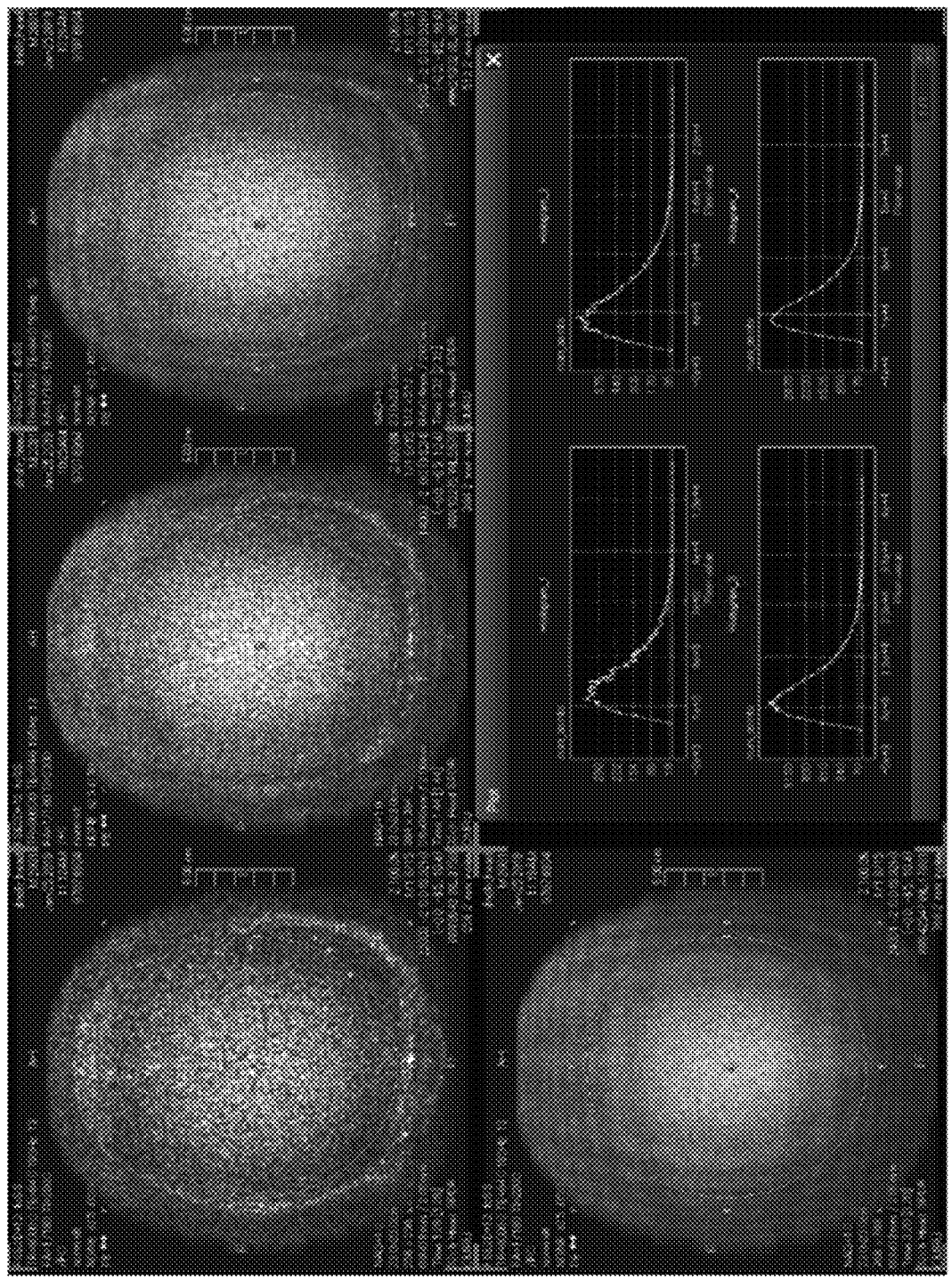
FIG. 4 is a series of four noise-only images at four different exemplary spatial resolutions.

As part of the process of estimating noise distribution of the imaging environment, at least one environment test image that is noise-only is acquired from the imaging environment under a particular set of imaging conditions that correspond to conditions under which later patient images will be obtained that need to be denoised. In one such configuration, data for at least one environment test image is acquired at a lowest possible RF pulse (e.g., with the excitation pulse turned off or with the lowest possible flip angle set (e.g., 1 degree). The acquired data is used to reconstruct (online or offline) at least one reconstructed image. FIG. 4 shows a number of environment test images that are noise-only that are acquired at different spatial resolutions that correspond to conditions under which later patient images may be acquired. The image matrix sizes are 256×256 (upper-left), 384×384 (upper-middle), 512×512 (upper-right) and 768×768 (lower left).

Figure 5:
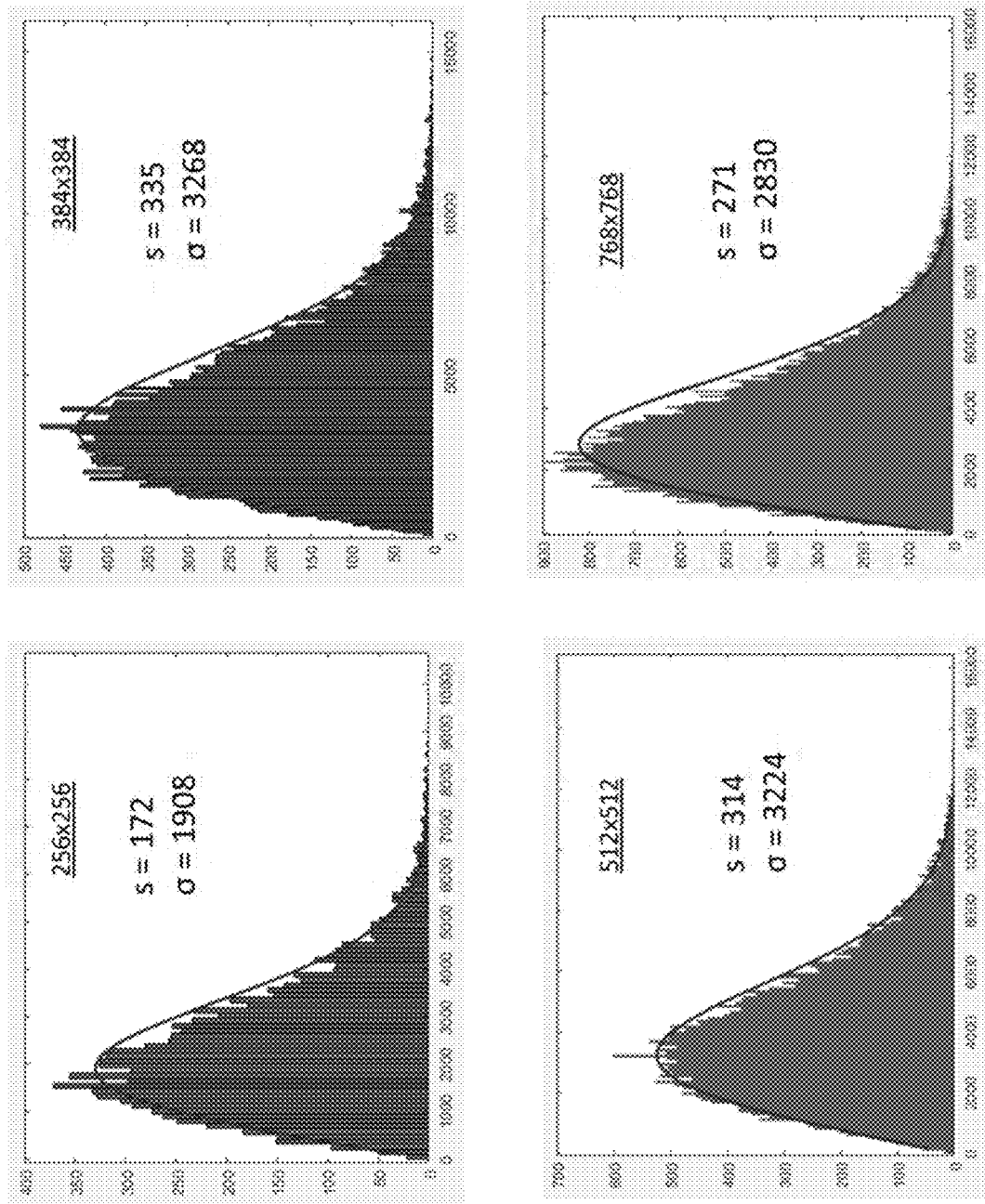
FIG. 5 is a series of statistical distributions corresponding to each of the four exemplary spatial resolutions of FIG. 4.

In order to find the noise distribution, the histogram (analogous to the probability distribution function) of the image within a user-defined ROI is fitted to a statistical distribution as shown in FIG. 5 for each of the four exemplary spatial resolutions of FIG. 4. In one embodiment, the noise distribution are estimated for a number of different major reconstruction methods (e.g., SENSE, compressed sensing, and sum-of-squares coil combination) to confirm that the noise from reconstruction follows the expected distribution.

Figure 6C:
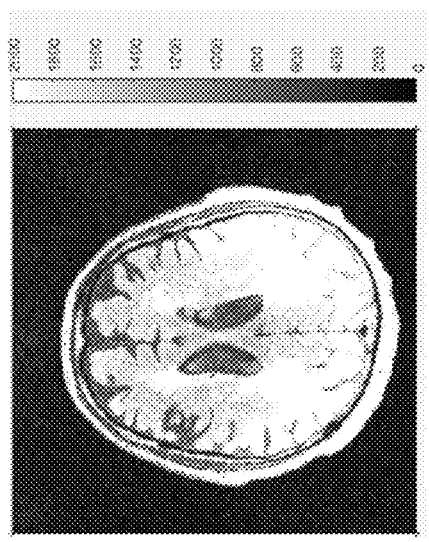
FIGS. 6A-6C are a series of three images showing a reconstructed image (FIG. 6A) versus the same image (1) without masking but with intensity correction (FIG. 6B) and (2) without masking and without intensity correction (FIG. 6C)
Figure 6B:
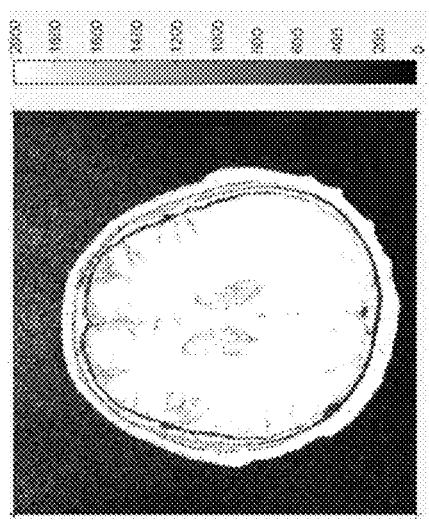
Figure 6A:
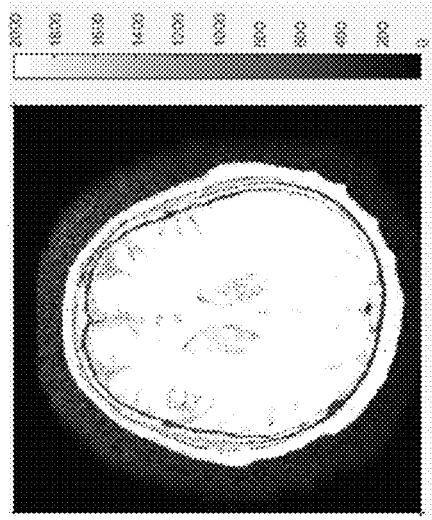

In addition to determining a noise distribution corresponding to noise-only images, a noise level is calculated as well under actual imaging conditions. To do so, in vivo data is acquired for a given scan condition, and images are reconstructed without intensity correction and masking. Since SNR is to be measured, these images are acquired using a regular protocol, and they are not noise-only scans as described earlier. By measuring the noise in vivo, the measured noise includes the tissue thermal noise contribution. Intensity correction artificially amplifies the noise near the center when a PAC (phased array coil) is used. Therefore, the measured noise values will include a positive bias if intensity correction is not turned off. Images should be selected so that sufficient background voxels where noise can be measured exist in the images. FIGS. 6B and 6C shows the effects of turning off masking in an exemplary image (as compared to FIG. 6A), both with intensity correction (FIG. 6B) and without intensity correction (FIG. 6C).

The method can then measure mean image intensity (s) inside the anatomy of interest. Mean intensity inside the anatomy of interest is measured inside image masks that include the whole anatomy and no background voxels, such as an image mask for a brain image shown in FIG. 7B. In addition, mean noise is measured in at least one user-specified location (e.g., inside at least one manually drawn region of interest (ROI) that includes only background voxels) of an original (unmasked) image, such as shown in FIG. 7A. By manually drawings or indicating at least one ROI (such as the rectangle in FIG. 7A), any imaging artifacts such as SPEEDER edges, Nyquist ghosts and pulsatile flow artifacts are avoided.

Alternatively, mean noise can be measured from at least one location (such as a known corner of a given size) in the image predefined to include only background voxels, and the user aligns the image to be processed such that only background voxels exist in that location and again avoids any artifacts such as parallel imaging artifacts, Nyquist ghosts and pulsatile flow artifact.

The system and method can then calculate noise standard deviation using the following formula: Noise std dev ($\hat{\sigma}$)=mean intensity inside background ROI/sqrt(pi/2).

As noted above, in magnitude images, the background voxels which include only noise follow a Rician distribution. If noise level is directly calculated as the standard deviation of the background voxels, it will include a bias due to the Rician distribution. In tissue voxels, due to the high SNR, the image intensity follows a Gaussian distribution. Thus, directly measuring the mean value inside the anatomy is an accurate measure of signal mean. The signal-to-noise can then be calculated as: SNR=$\mu/\hat{\sigma}$. For a given protocol, the final SNR value is computed as an average of SNR of all the slices inside the coverage.

A noise range can then be calculated. For a given contrast, the scan conditions that can change the noise level and/or distribution are specified. For example, spatial resolution is a scan parameter that changes noise level. However, sum-of-squares and SPEEDER reconstruction follow different noise distributions. So, SNR is measured for a range of scan parameter values, and SNR is converted to noise level as a percentage of mean image intensity according to: Noise level=100/SNR. The training data noise range can then be adjusted based on the noise level measurements.

For example, Table I shows the noise level measurements in a FLAIR image across three different resolutions. From this table, FLAIR training noise range could be set to {3%, 12%}, for example.

TABLE I

| Resolution | SNR | Noise Level |
|---|---|---|
| 256×256 | 25.88 | 3.86% |
| 384×384 | 11.94 | 8.37% |
| 512×5 | 8.38 | 11.93% |

Having determined the imaging environment conditions, the system and method can then turn to generating pairs of noisy input images and target images for training. As noted above, to achieve increased accuracy, training images differ only in noise otherwise the machine learning system may learn to remove structure from the input images. To address the absence of a perfect anatomical match between input and target images; the input images are created by adding region specific synthetic noise to the high-SNR target images. Synthetic noise is added such that it truly represents the MR noise distribution for the target application. For example, in MR training images, noise in the high-SNR tissue voxels are expected to follow the Gaussian distribution, whereas, the low-SNR background voxels are expected to follow the Rician distribution. Following steps are used to generate training images with synthetic noise.

Figure 8:
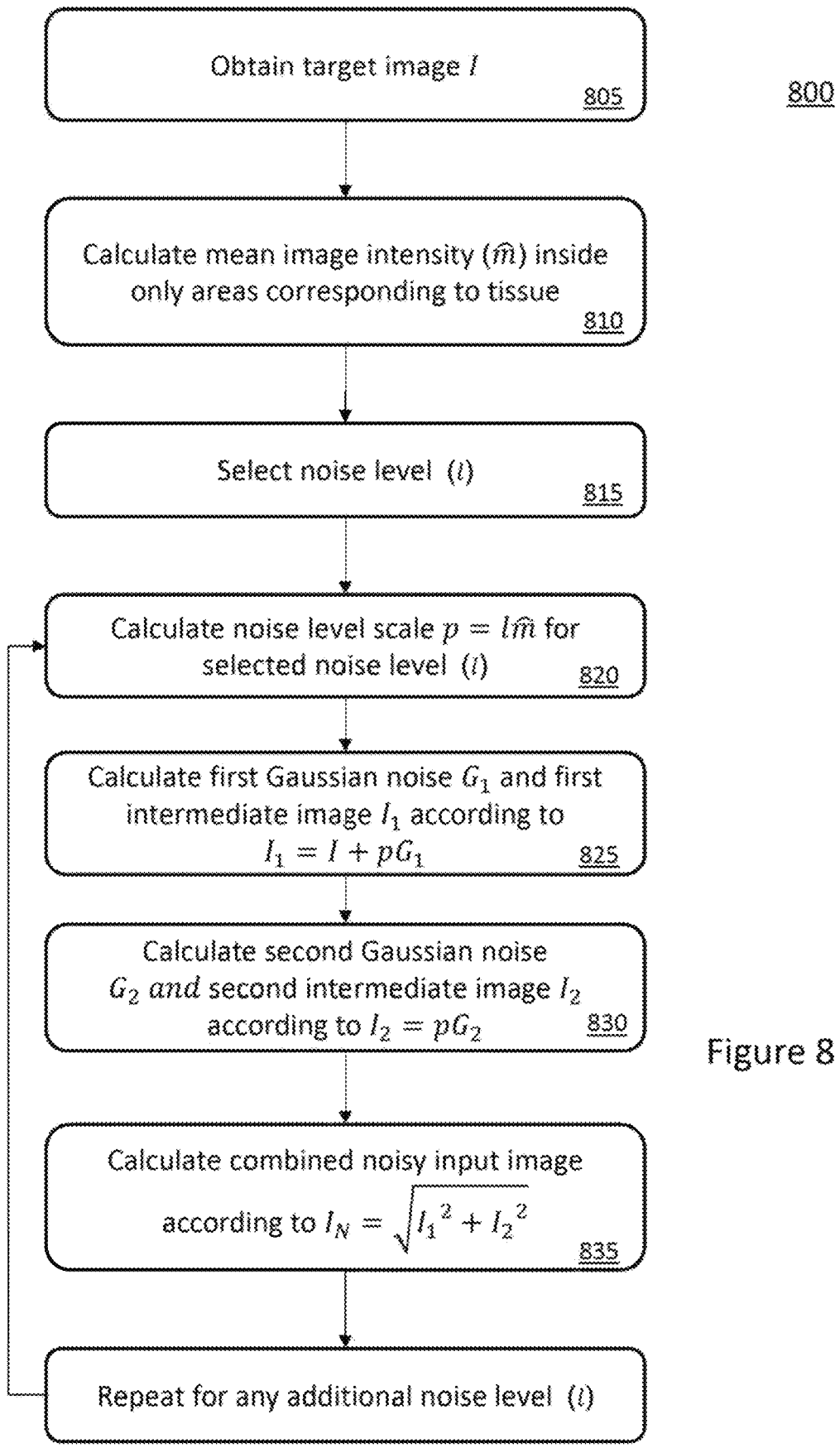
FIG. 8 is a flowchart showing an exemplary method of generating a training image of noise level (l) from a plurality of Gaussian noise images and a target image I.

As shown in the flowchart of FIG. 8, a target high-NAQ image I is obtained in step 805 under conditions corresponding to the system to be trained. In step 810, the mean image intensity of the target image (to which noise is later to be added) is calculated by (1) defining an image mask (e.g., using image thresholds) covering only tissue voxels, (2) computing mean target image intensity ($\hat{m}$) inside the tissue mask, and (3) defining a range of noise scale as a scalar of image mean intensity. In step 815, a noise level (l) of noise to be added to the target image is selected, and in steps 820-835 the process uses the selected noise level (l). In step 820, the noise level (l) is used to calculate the noise scale (p) according to p=l$\hat{m}$. Since the noise level is computed from image SNR measurements, the noise scale is defined as a percentage of the mean image intensity, not the maximum image intensity, inside a tissue mask.

In steps 825 and 830, at least two zero-mean Gaussian noise images (e.g., $G_1$ and $G_2$) are calculated. In one embodiment, at least two images are each generated with standard deviation 1. In one embodiment, the at least two images are each generated with the same dimensions (n by m) as the (n by m pixel) target high-NAQ image, although in other embodiments more images can be used and assigned to sub-regions of the target high-NAQ image. For example, first and second (n/2 by m pixel) noise images can be used to process the left half of an (n by m pixel) target high-NAQ image while third and fourth (n/2 by m pixel) noise images can be used to process the right half of the (n by m pixel) target high-NAQ image. In systems utilizing more than two types of noise, additional noise images may also be generated in similar steps (not shown). When using a (pseudo) random number generator function, the "seed" value to the function is preferably not repeated or at most infrequently repeated to reduce the effect of repeating the same noise in multiple training images.

Also, in steps 825 and 830, at least first and second intermediate images $I_1$ and $I_2$ are generated as follows $$I_1 = I + pG_1$$

$$I_2 = pG_2$$

The input noisy image ($I_N$) is generated using the at least first and second intermediate images as follows:

$$I_N = \sqrt{I_1^2 + I_2^2}$$

In high-SNR environments/areas, image I contains virtually zero noise, so then $I_1$ only contains Gaussian noise $G_1$. By definition, $I_2$ only contains noise $G_2$ which is relatively much smaller than $I_1$, (i.e., $I_2 \ll I_1$), so $I_N \sim I_1$. Thus, in high-SNR environments, $I_N$ would contain only Gaussian-distributed noise.

Similarly, in the low-SNR case, if I was assumed to be 0, then $I_2 \sim I_1$ in magnitude, then $I_N$ will follow a Rician distribution, since $I_N$ is computed as a magnitude of two Gaussian noise sources $I_1$ and $I_2$, and since Gudbjartsson has shown that the magnitude operation on two images (which typically are the real and imaginary parts of the same image) with Gaussian-distributed noise sources is Rician.

Figure 9A:
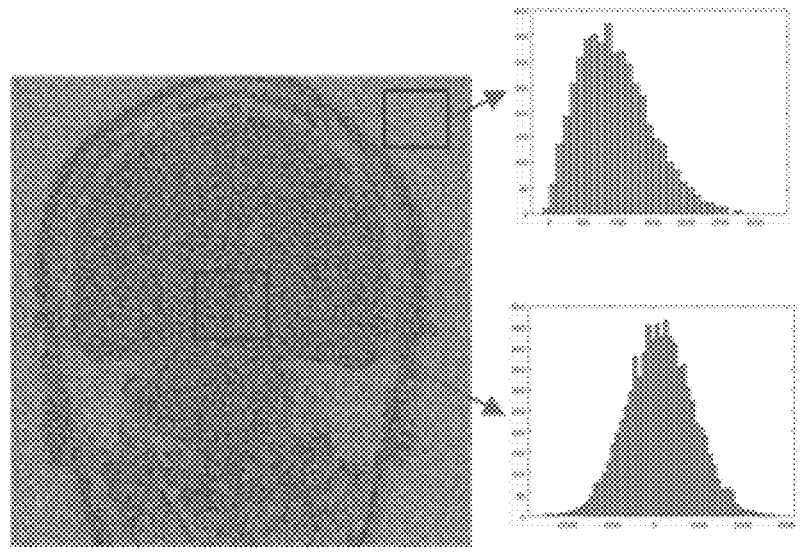
FIG. 9A is an image of a training image residue and upper and lower histogram plots showing a Gaussian noise distribution in a tissue area and a Rician noise distribution outside of the tissue area, respectively.
Figure 9B:
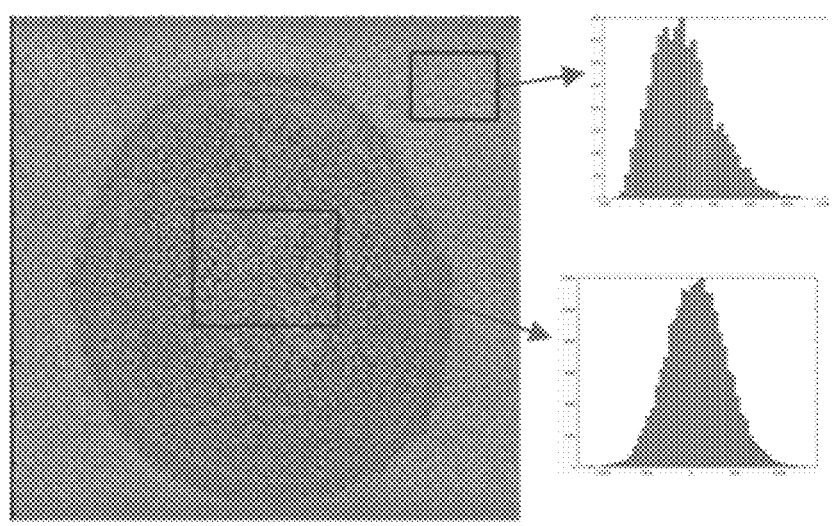
FIG. 9B is an image of a test image residue and upper and lower histogram plots showing a Gaussian noise distribution in a tissue area and a Rician noise distribution outside of the tissue area, respectively.

FIGS. 9A and 9B show the residual of an example training image pair generated using the described method. The training image residual of FIG. 9A is computed by subtracting the high-NAQ target image from the synthetically-generated noisy input image. As expected from the described method, noise in the tissue voxels follow a Gaussian distribution and noise in background voxels follow a Rician distribution. Similarly, an example test residual image is shown in FIG. 9B. When de-noising works well, it removes Gaussian and Rician noise from tissue and background voxels, respectively.

Figure 10A:
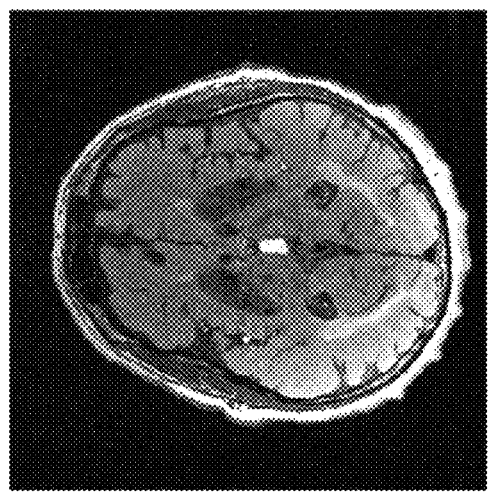
FIG. 10A is an exemplary low NAQ image.
Figure 10B:
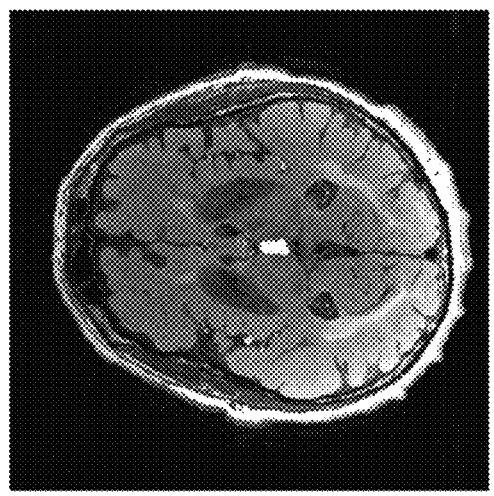
FIG. 10B is an exemplary high NAQ image.
Figure 10C:
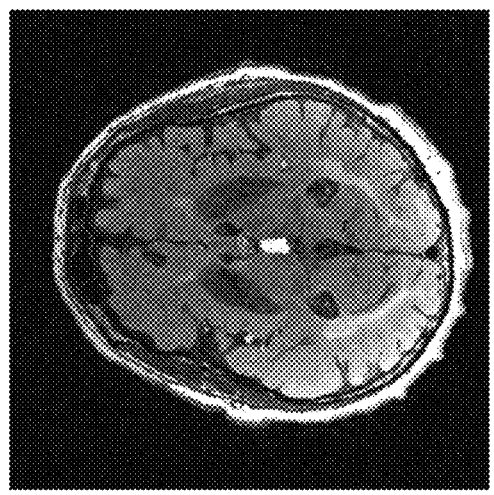
FIG. 10C is an exemplary high NAQ image to which noise has been added causing it to look like the image of FIG. 10A.

FIGS. 10A-10C show that the added synthetic noise can be visually verified. FIG. 10A shows an illustrative low-NAQ image having a noise level that can be measured as described above. FIG. 10B shows an illustrative high NAQ image that is acquired to match the low-NAQ image of FIG. 10A. Noise at the level measured in FIG. 10A is then added to the high-NAQ image of FIG. 10B to produce the noisy image of FIG. 10C which is compared (e.g., visually or in an automated fashion) to FIG. 10A to show that their images are substantially similar. The steps of FIGS. 10A-10C can be repeated for different scan conditions.

In addition to the general processes described above, additional image enhancement steps can be performed. According to a first enhancement, high-NAQ target images are generated by averaging a set of NAQ-1 images. When doing so, image registration between NAQ-1 images is performed to reduce blurriness in resulting images and/or to prevent fine structures (e.g., such as small vessels) from being lost. In one embodiment of registering NAQ-1 images, an intensity-based rigid-body image registration method is used to register all the NAQ-1 images. In one such embodiment, a gradient descent optimizer is used to perform the registration (for each application (anatomy+contrast)) so that application-specific registration parameters that produce the least registration error are calculated according to the processes described below:

optimizing gradient descent parameters (e.g., at least one of or all of: minimum step length, relaxation factor, maximum iterations, and gradient magnitude tolerance);

defining a search space for each parameter;

performing image registration over the search space of one of the gradient descent parameters, keeping all other parameters constant, and repeating for all parameters, thereby solving a multi-parameter optimization problem; and storing the optimized gradient descent parameter values for all applications.

Figures 11A, 11B, 11C:
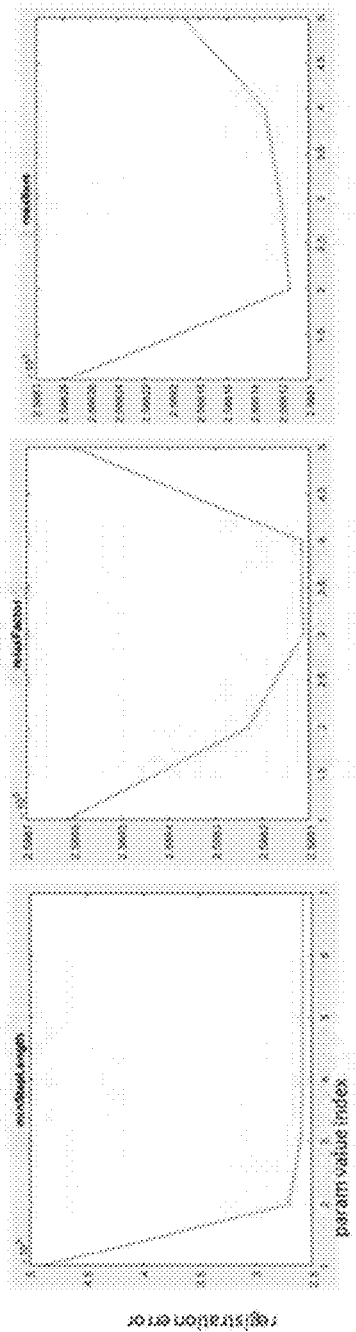
FIGS. 11A-11C illustrate plots of registration error values across a range of gradient descent optimizer values including minimum step length in FIG. 11A, relaxation factor in FIG. 11B, and maximum iterations in FIG. 11C.

FIGS. 11A-11C illustrate plots of registration error values across a range of gradient descent optimizer values. FIG. 11A illustrates registration error with changing minimum step length. FIG. 11B illustrates registration error with changing relaxation factor. FIG. 11C illustrates registration error with changing maximum iterations. In FIGS. 11A-11C, change in minimum step length caused the largest change in registration error.

Figures 12A, 12B, 12C:
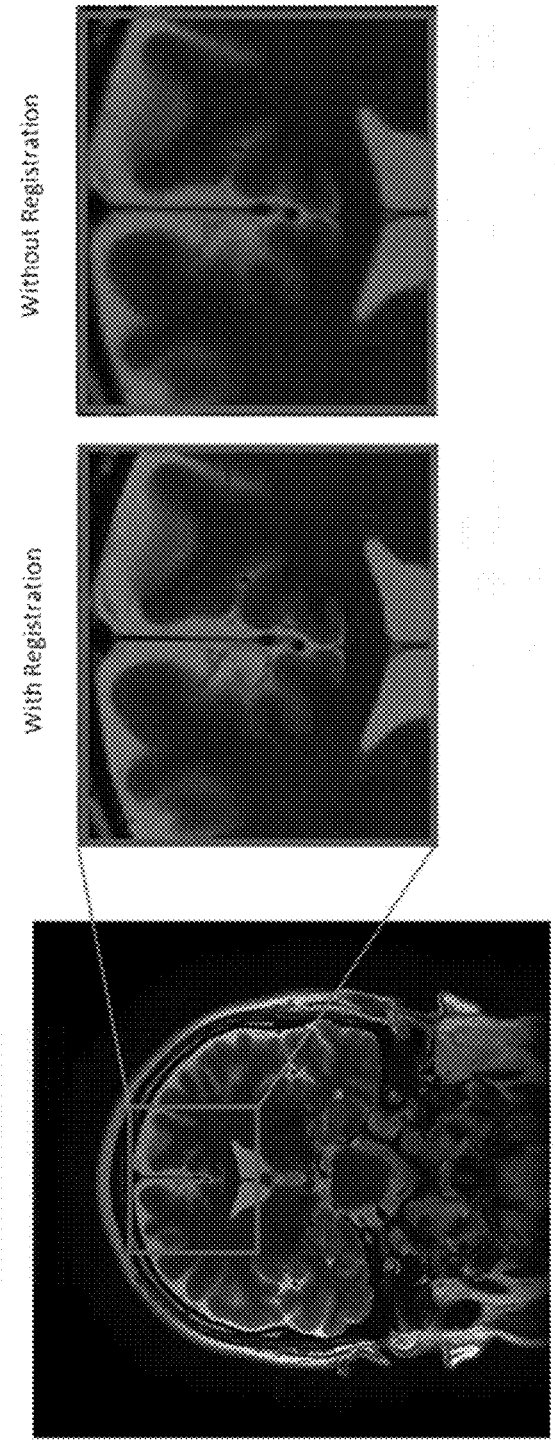
FIG. 12A is an example original image of a brain scan that has a portion of which that is enlarged in FIGS. 128 and 12C.
FIG. 12B is an enlarged portion of FIG. 12A that was generated with registration.
FIG. 12C is an enlarged portion of FIG. 12A that is blurry as it was generated without registration.

FIG. 12A is an example target image of a brain, a portion of which has been enlarged and shown in FIG. 12B with registration and in FIG. 12C without registration. The image of FIG. 12C is blurrier than the image of FIG. 12B.

As a second enhancement, although digital images, such as MR images, can have any arbitrary intensity value range, both training and test images are normalized to match the value ranges that are to be expected from images taken from actual imaging equipment. One embodiment of image normalization and clipping is described below, but other normalization and clipping methods can be used First, magnitude target images are normalized to a specified signal range [0, maxVal](e.g., [0, 16383]) which remains in the intensity range set by the reconstruction pipeline. Preferably, maxVal is chosen to avoid dynamic range compression and 'white-out' of high signal regions. One form of normalization of the target image I is linear normalization given by:

$$I = (1 - \text{Min})\frac{new\text{Max} - new\text{Min}}{\text{Max} - \text{Min}} + new\text{Min},$$

where, Min and Max are the minimum and maximum intensity values of the original image and newMin and newMax are the minimum and maximum values of the new intensity range. In this case, newMin=0 and newMax=maxVal, e.g., newMax=16383.

Furthermore, after target images are created using the registration and normalization processes discussed above, and after generating noisy images using the noise adding process described above, a further enhancement clips the resulting noisy image so that the clipped noisy input image (like the previously normalized target image) is restricted to the range [newMin, newMax]. This enhancement is performed because after adding noise to the normalized target image, some voxels in the generated input noisy image may have intensity values outside the range [newMin, newMax] resulting in undesirably different intensity ranges between the input and target images in a training pair. However, renormalization of the input image can generate artificial/undesirable structural differences between the input and target images.

Figure 13A:
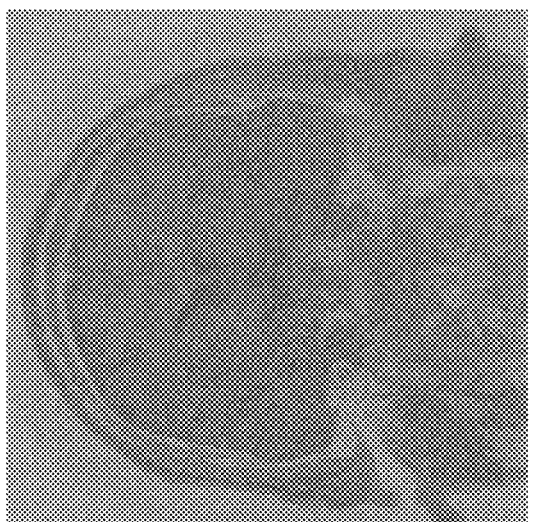
FIG. 13A is a residual image generated from a noisy image to which normalization was applied (after adding noise to the target image of FIG. 13C)
Figure 13B:
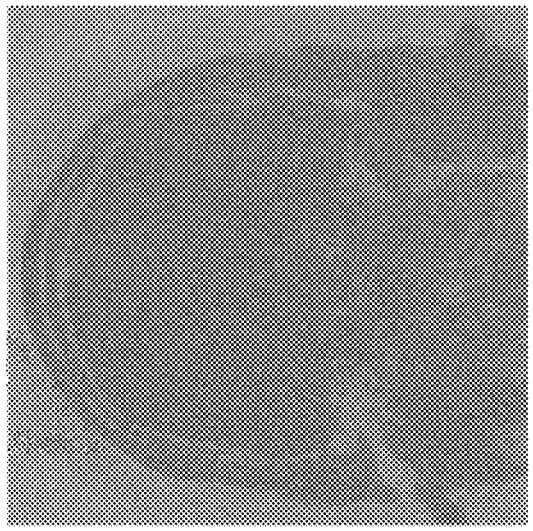
FIG. 13B is a residual image generated from a noisy image to which clipping was applied (after adding noise to the target image of FIG. 13C)
Figure 13C:
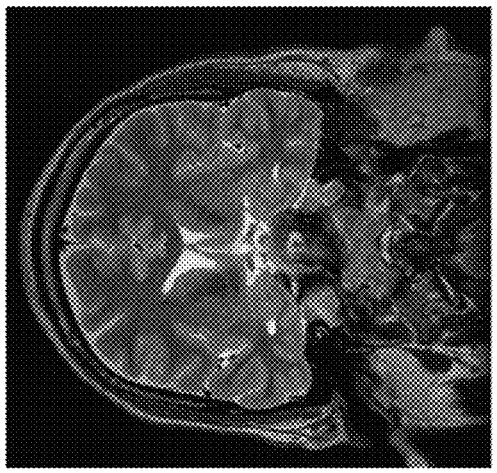
FIG. 13C is an original target image which is part of a training pair.

To avoid such differences, the input image is instead clipped to the same intensity range as the target image (as shown in FIG. 13C). Both clipping and normalization introduce some amount of non-linearity. However, clipping only affects a few voxels (e.g., bright skull fat that falls outside the original intensity range). On the other hand, normalization (as shown in FIG. 13A) affects a larger number of voxels since the entire image is rescaled to the new intensity range. The normalized image difference of FIG. 13A shows undesirable structure in the residual image. If a machine learning-based system is trained using the normalized image, then it may learn to incorrectly remove those structures from the image. On the other hand, the clipped residual image (as shown in FIG. 13B) only contains noise, as desired. Therefore, intensity clipping of input images may provide advantages over normalization.

For an image I and image normalization range [newMin, newMax], the clipping operation is applied at each spatial location (x,y) as follows $I(x,y) = \max(I(x,y), \text{newMin})$ $I(x,y) = \min(I(x,y), \text{newMax})$ As would be appreciated by those of skill in the art, the image information may be converted to either single or double precision floating point format depending on the capabilities supported by the architecture and/or the amount of precision that is needed in the calculations.

Figures 14A, 14B:
FIGS. 14A and 14B respectively are an exemplary noisy test image and a denoised image having been processed by a machine learning-based system using target images and noisy images generated from target images.

Together the noisy images and the target images can be used to train a machine learning-based system to convert future noisy images (e.g., FIG. 14A) taken under real world conditions into a denoised image (e.g., FIG. 14B).

Figure 15:
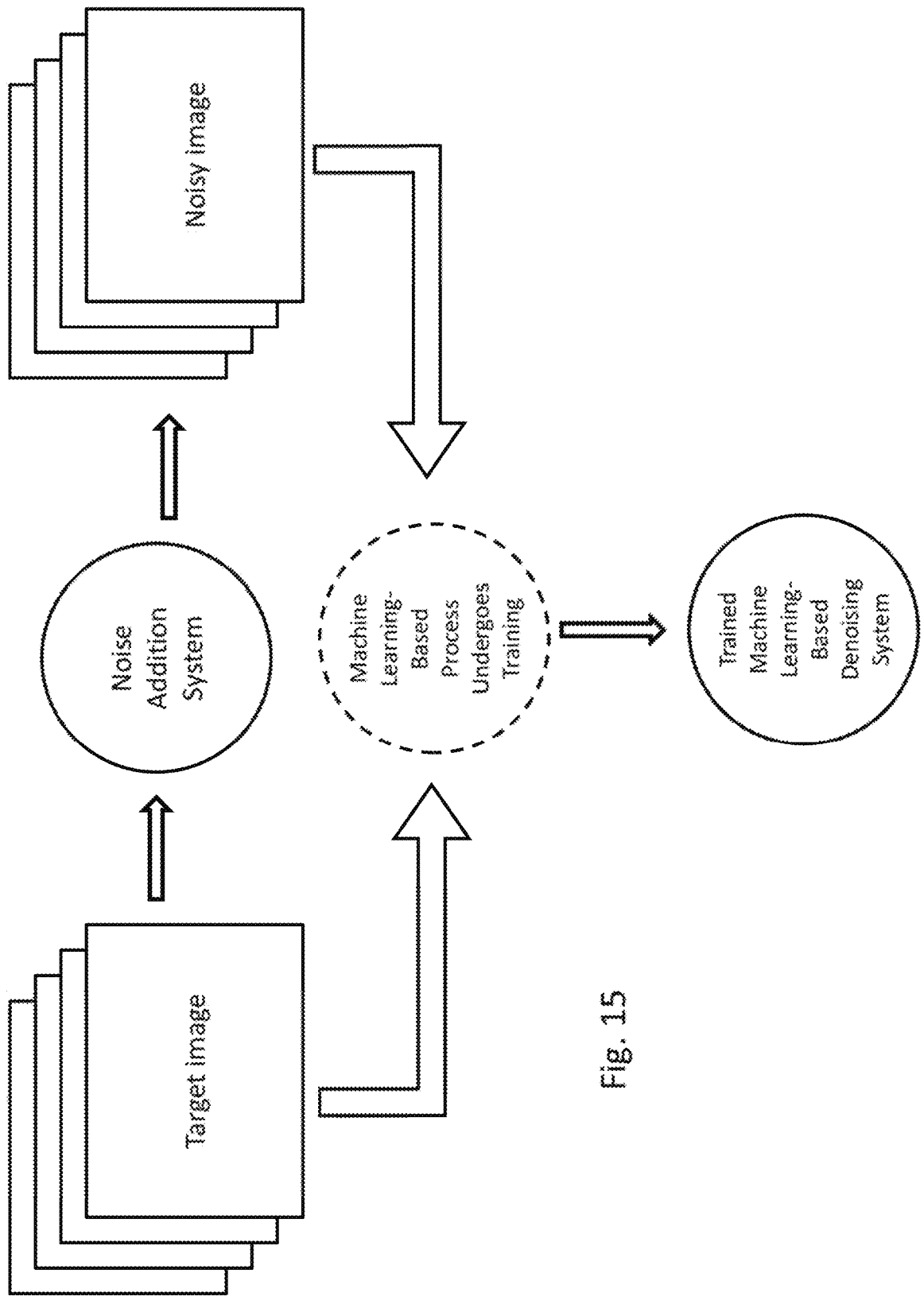
FIG. 15 is a block diagram of a general architecture for a system and method for generating noisy images from target images to train a machine learning-based system to produce a trained machine learning-based system for denoising images.

Processing circuitry can be configured to perform various steps of the methods described herein (including, but not limited to the methods 300 and/or 800 described herein and variations thereof) and to act as the Noise Addition System and/or the Machine Learning-based system of FIG. 15. The processing circuitry can include discrete logic gates, an Application Specific Integrated Circuit (ASIC), a Field Programmable Gate Array (FPGA) or other Complex Programmable Logic Device (CPLD). An FPGA or CPLD implementation may be coded in VHDL, Verilog, or any other hardware description language and the code may be stored in an electronic memory directly within the FPGA or CPLD, or as a separate electronic memory. Further, the memory may be non-volatile, such as ROM, EPROM, EEPROM, ferroelectric memory or FLASH memory. The memory can also be volatile, such as static or dynamic RAM, and a processor, such as a microcontroller or microprocessor, may be provided to manage the electronic memory as well as the interaction between the FPGA or CPLD and the memory.

Alternatively, the processing circuitry can be implemented as a computer processor (CPU) that executes a computer program including a set of computer-readable instructions that perform various steps of method 300 and/or method 800 to produce a trained machine learning-based system as shown in FIG. 15, the program being stored in any of the above-described non-transitory electronic memories and/or a hard disk drive, CD, DVD, FLASH drive or any other known storage media. Further, the computer-readable instructions may be provided as a utility application, background daemon, or component of an operating system, or combination thereof, executing in conjunction with a processor, such as a Xenon processor from Intel of America or an Opteron processor from AMD of America and an operating system, such as MICROSOFT WINDOWS, UNIX, SOLARIS, LINUX, APPLE MAC-OS and other operating systems known to those skilled in the art. Further, the CPU can be implemented as multiple processors, each with one or more threads, and/or a single processor with multiple threads where different parts of the CPU cooperatively work in parallel to perform the instructions.

The system further may include at least one wireless or wired network controller, such as an Intel Ethernet PRO network interface card from Intel Corporation of America, that can interface between the various parts of the imaging system and the machine learning-based system. Additionally, the network controller can also interface with an external network. As can be appreciated, the external network can be a public network, such as the Internet, or a private network such as an LAN or WAN network, or any combination thereof and can also include PSTN or ISDN sub-networks. The external network can also be wired, such as an Ethernet network, or can be wireless such as a cellular network including EDGE, 3G and 4G wireless cellular systems. The wireless networks herein can also be WiFi, Bluetooth, or any other wireless form of communication that is known.

As would be appreciated by those of skill in the art, the system for training a machine-learning based denoising system and for implementing the machine-learning based denoising system need not be the same. For example, a processor-based system can be taught from the noisy images and target images to produce a series of weights associated with a set of connections in an artificial neural network that performs the denoising operation. However, those connections and weights can be re-implemented as a series of logic in a programmable logic device (e.g., a CPLD or FPGA) to which images to be denoised are applied. Similarly, various portions of the training system and the resulting need not be implemented using a single computer programming language or technique. A system for adding noise to target images may be written in a first computer language/environment supporting parallel operations to add noise to at least one target image in parallel, whereas the training of the machine learning-based system is written in a second language as a serial implementation, and the resulting trained system is produced to run in serial or in parallel and executed directly in hardware or in a third computer language that is either the same as at least one of the first and second languages or different than both.

In the preceding description, specific details have been set forth, such as a particular geometry of a processing system and descriptions of various components and processes used therein. It should be understood, however, that techniques herein may be practiced in other embodiments that depart from these specific details, and that such details are for purposes of explanation and not limitation. Embodiments disclosed herein have been described with reference to the accompanying drawings. Similarly, for purposes of explanation, specific numbers, materials, and configurations have been set forth in order to provide a thorough understanding. Nevertheless, embodiments may be practiced without such specific details. Components having substantially the same functional constructions are denoted by like reference characters, and thus any redundant descriptions may be omitted.

Various techniques have been described as multiple discrete operations to assist in understanding the various embodiments. The order of description should not be construed as to imply that these operations are necessarily order dependent. Indeed, these operations need not be performed in the order of presentation. Operations described may be performed in a different order than the described embodiment. Various additional operations may be performed and/or described operations may be omitted in additional embodiments.

Those skilled in the art will also understand that there can be many variations made to the operations of the techniques explained above while still achieving the same objectives of the invention. Such variations are intended to be covered by the scope of this disclosure. As such, the foregoing descriptions of embodiments of the invention are not intended to be limiting. Rather, any limitations to embodiments of the invention are presented in the following claims.

What is claimed is:

1. An apparatus, comprising:
   processing circuitry configured to
   obtain a target medical image I,
   obtain first and second zero-mean Gaussian noise images, $G_1$ and $G_2$, respectively,
   obtain a first intermediate image $I_1$ generated based on the target medical image I and the first zero-mean Gaussian noise image $G_1$,
   obtain a second intermediate image $I_2$ generated based the second zero-mean Gaussian noise image $G_2$, but not based on the target medical image I, and
   obtain an input noisy image $I_N$ generated using the first and second intermediate images according to a non-linear combination of the first and second intermediate images.

2. The apparatus of claim 1, wherein the processing circuitry configured to obtain the target medical image I comprises processing circuitry configured to obtain a magnetic resonance imaging image.

3. The apparatus of claim 1, wherein the first and second zero-mean Gaussian noise images have dimensions corresponding to dimensions of the target medical image I.

4. The apparatus of claim 1, wherein the processing circuitry configured to obtain the first intermediate image $I_1$ comprises processing circuitry configured to obtain the first intermediate image $I_1$ using a noise scale (p) and generated according to:

$$I_1 = I + pG_1,$$

wherein the processing circuitry configured to obtain the second intermediate image $I_2$ comprises processing circuitry configured to obtain the second intermediate image $I_2$ generated according to:

$$I_2 = pG_2, \text{ and}$$

wherein the processing circuitry configured to obtain the input noisy image $I_N$ generated using the first and second intermediate images according to the non-linear combination of the first and second intermediate images comprises processing circuitry configured to obtain the input noisy image $I_N$ generated according to:

$$I_N = \sqrt{I_1^2 + I_2^2}.$$

5. The apparatus of claim 1, wherein the processing circuitry further is configured to normalize the target medical image I using a linear normalization.

6. The apparatus of claim 5, wherein the linear normalization is given by:

$$I = (1 - \text{Min}) \frac{\text{newMax} - \text{newMin}}{\text{Max} - \text{Min}} + \text{newMin},$$

where, Min and Max are the minimum and maximum intensity values of the original image and newMin and newMax are the minimum and maximum values of the new intensity range.

7. The apparatus of claim 1, wherein the processing circuitry further comprises processing circuitry configured to:
obtain third and fourth zero-mean Gaussian noise images, $G_3$ and $G_4$,
obtain a third intermediate image $I_3$ generated based on the target medical image I and the third zero-mean Gaussian noise image $G_3$,
obtain a fourth intermediate image $I_4$ generated based the fourth zero-mean Gaussian noise image $G_4$, but not based on the target medical image I, and
obtain another input noisy image $I_{N2}$ generated using the third and fourth intermediate images according to:

$$I_{N2} = \sqrt{I_3^2 + I_4^2}.$$

8. The apparatus of claim 5, wherein the processing circuitry further comprises processing circuitry configured to clip the input noisy image $I_N$ to a range [newMin, newMax].

9. The apparatus of claim 5, wherein the processing circuitry further comprises processing circuitry configured to normalize the input noisy image $I_N$ to a range [newMin, newMax].

10. The apparatus of claim 1, further comprising an untrained machine learning-based system receiving the input noisy image $I_N$ as an input and the target medical image I as a target output to produce a trained machine learning-based system.

11. The apparatus as claimed in claim 10, wherein the untrained machine learning-based system comprises a neural network.

12. The apparatus as claimed in claim 10, wherein the untrained machine learning-based system comprises a convolution neural network.

13. The apparatus as claimed in claim 1, wherein the first and second zero-mean Gaussian noise images, $G_1$ and $G_2$ each have a standard deviation of 1.

14. The apparatus as claimed in claim 1, wherein the target medical image I and the first and second zero-mean Gaussian noise images, $G_1$ and $G_2$, have equal dimensions.

15. The apparatus as claimed in claim 1, wherein the processing circuitry is further configured to:
obtain a non-Gaussian noise image, NG, and
obtain a third intermediate image $I_3$ generated based on the non-Gaussian noise image, NG, and
wherein the processing circuitry configured to obtain the input noisy image $I_N$ comprises processing circuitry configured to obtain the input noisy image $I_N$ generated using the first and second intermediate images and the non-Gaussian noise image according to a non-linear combination of the first, second, and third intermediate images.

16. A trained machine learning-based system trained using the apparatus of claim 10.

17. A trained machine learning-based system as claimed in claim 16, wherein the untrained machine learning-based system comprises a neural network.

18. A trained machine learning-based system as claimed in claim 16, wherein the untrained machine learning-based system comprises a convolutional neural network.

19. An image processing method comprising:
obtaining a target medical image I,
obtaining first and second zero-mean Gaussian noise images, $G_1$ and $G_2$, respectively,
obtaining a first intermediate image $I_1$ generated based on the target medical image I and the first zero-mean Gaussian noise image $G_1$,
obtaining a second intermediate image $I_2$ generated based the second zero-mean Gaussian noise image $G_2$, but not based on the target medical image I, and
obtaining an input noisy image $I_N$ generated using the first and second intermediate images according to a non-linear combination of the first and second intermediate images.

20. The method of claim 19, wherein the obtaining the first intermediate image $I_1$ comprises obtaining the first intermediate image $I_1$ using a noise scale (p) and generated according to:

$$I_1 = I + pG_1,$$

wherein the obtaining the second intermediate image $I_2$ comprises obtaining the second intermediate image $I_2$ generated according to:

$$I_2 = pG_2, \text{ and}$$

wherein the obtaining the input noisy image $I_N$ generated using the first and second intermediate images according to the non-linear combination of the first and second intermediate images comprises obtaining the input noisy image $I_N$ generated according to:

$$I_N = \sqrt{I_1^2 + I_2^2}.$$

* * * * *